June 16, 1959 J. S. MATTHEWS 2,890,797

COMBINATION SAMPLING-TESTING DEVICE

Filed Nov. 29, 1955

INVENTOR.
JOSEPH S. MATTHEWS
BY
Brown, Critchlow, Flick & Peckham
HIS ATTORNEYS

United States Patent Office 2,890,797

Patented June 16, 1959

2,890,797

COMBINATION SAMPLING-TESTING DEVICE

Joseph S. Matthews, Pittsburgh, Pa., assignor to Mine Safety Appliances Company, Pittsburgh, Pa., a corporation of Pennsylvania Application November 29, 1955, Serial No. 549,680

3 Claims. (Cl. 210—488)

This invention relates to means for collecting a sample of particulate matter and facilitating testing of it by solvent extraction.

It is among the objects of this invention to provide a solvent extraction device, which can be used in both the sampling and testing of particulate matter, which is simple and inexpensive, and which is easy to handle.

In accordance with this invention, a disc of filtering material for collecting a sample of particulate matter is surrounded by a ring of absorbent material, on which tests are made later after some of the sample has been transferred to the ring by solvent extraction. To permit this transfer, the marginal area of the disc is in engagement with the inner marginal area of the ring. The disc and ring are connected together at these marginal areas, preferably by providing one of them with circumferentially spaced radial slots that receive the adjoining portion of the other one in such a manner that parts of the disc overlap one side of the ring, while other parts of the disc overlap the other side of the ring.

The invention is illustrated in the accompanying drawings in which.

Figure 1:
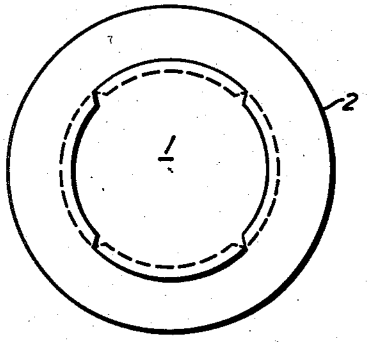
Fig. 1 is a view of one side of my sampling and testing device.
Figure 2:
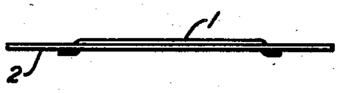
Fig. 2 is an enlarged edge view thereof.
Figure 3:
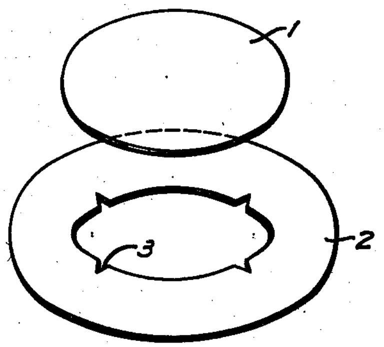
Fig. 3 is an exploded view.

Referring to Figs. 1 to 3 of the drawings, a disc 1, preferably circular, is made of a filtering material suitable for the sample of particulate matter that is to be collected. For example, the filtering material may be fiber glass paper or other types of filter papers; or filter papers impregnated with various adsorbents, such as carbon or silica gel. In any event, the disc should be made of a material which is best suited for its particular filtering purpose. Usually, however, the material of the disc will not be suitable for use in testing the sample collected. It is therefore a feature of this invention that the disc is encircled by a ring 2 made of material that is better adapted for the testing operation. This material should be absorbent so that it will absorb solvent applied to the disc held in engagement with the ring. If the test involves the addition of a reagent, the ring should not by itself react with the reagent or with the substance being tested. A suitable material for the ring may be a filter paper or chromatography grade paper.

Since this device depends upon the migration of solvent and particles of the sample from the disc to the ring, it is necessary that the two engage each other. This may be accomplished in different ways, but preferably it is done by providing either the edge of the disc or the inner edge of the ring with more or less radial slots or notches, of which there should be an even number and at least four. When the notches 3 are in the ring, circumferentially spaced sections of the marginal area of the disc, which is slightly larger than the inside of the ring, may be inserted in pairs of the notches so that at least two sections of the disc overlap one side of the ring while intermediate sections overlap the opposite side. This connects the disc and ring so that they can be handled as a single unit, and it also holds them in overlapping engagement.

As pointed out before, the primary purpose of the disc is to collect a sample, while the primary purpose of the ring is to provide a surface on which tests of the sample may be performed. The sample is collected on the disc by drawing through it air, a solution or a suspension containing the particulate matter in question. The device then is placed in a suitable extraction apparatus, for example that disclosed in the copending application of Paul W. McConnaughey, Serial No. 552,219, filed December 9, 1955. A suitable solvent then is applied to the disc, in which it spreads out and is absorbed by the surrounding ring along with part of the sample that is carried with the solvent by capillary action. The solvent evaporates from the ring, leaving the sample on it, and tests are conducted on the ring to make qualitative or quantitative determinations regarding the sample.

If an atmosphere is to be tested for more than one component, after collection on the disc the sample is separated into fractions by extraction with the appropriate solvents. Then, tests can be conducted on the ring for one fraction and the unextracted part can be tested for on the disc. In some cases it may be advantageous to use carbon impregnated paper to collect the sample. However, carbon would not be a good background on which to develop a color test, so the sample is extracted out to the encircling ring and tested there. Also, it may be necessary first to remove the substance to be tested from insoluble interfering substances, such as soot, dust, etc., which would obscure a color test.

Figure 4:
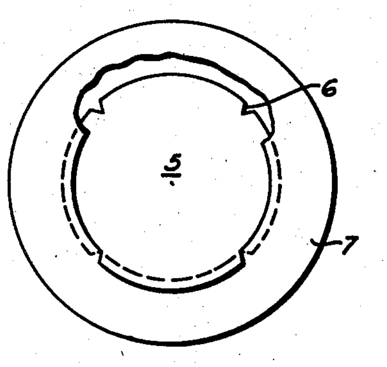
Fig. 4 is a view of a modification.

In the modification shown in Fig. 4, it is the filter disc 5 that is provided with notches 6 for receiving portions of the inner marginal area of the encircling testing ring 7.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A combination sampling and testing device for particulate matter extraction, consisting of only a sampling disc of filtering material disposed in and surrounded by a testing ring of liquid absorbent material, the major portion of the marginal area of the disc overlapping and engaging the major portion of the inner marginal area of the ring, portions of said disc marginal area engaging one side of the ring and other portions of the disc marginal area engaging the opposite side of the ring to interconnect the ring and disc into a single unit having contact between said overlapping marginal areas most of the way around the disc.

2. A combination sampling and testing device for particulate matter extraction, consisting of only a sampling disc of filtering material disposed in and surrounded by a testing ring of liquid absorbent material, the inner marginal area of the ring being provided with at least four circumferentially spaced outwardly extending notches receiving the edge of the disc to interconnect the ring and disc into a single unit in which portions of said marginal area of the ring overlap and engage opposite sides of the marginal area of the disc.

3. A combination sampling and testing device for particulate matter extraction, consisting of only a sampling disc of filtering material disposed in and sourrounded by a testing ring of liquid absorbent material, the edge of the disc being provided with at least four inwardly extending circumferentially spaced notches receiving the inner marginal area of the ring to interconnect the ring and disc into a single unit in which portions of said marginal area of the ring overlap and engage opposite sides of the marginal area of the disc.

References Cited in the file of this patent

UNITED STATES PATENTS

| | | |
|---|---|---|
| 1,012,639 | Holmgren | Dec. 26, 1911 |
| 1,482,433 | Hoffman | Feb. 5, 1924 |
| 1,865,982 | Van Doorn | July 5, 1932 |
| 2,046,566 | Lucas | July 7, 1936 |
| 2,464,921 | Chandler | Mar. 22, 1949 |
| 2,483,108 | Silverman et al. | Sept. 27, 1949 |
| 2,597,350 | Lucas | May 20, 1952 |
| 2,679,158 | Clayton | May 25, 1954 |